Figures 1, 2:
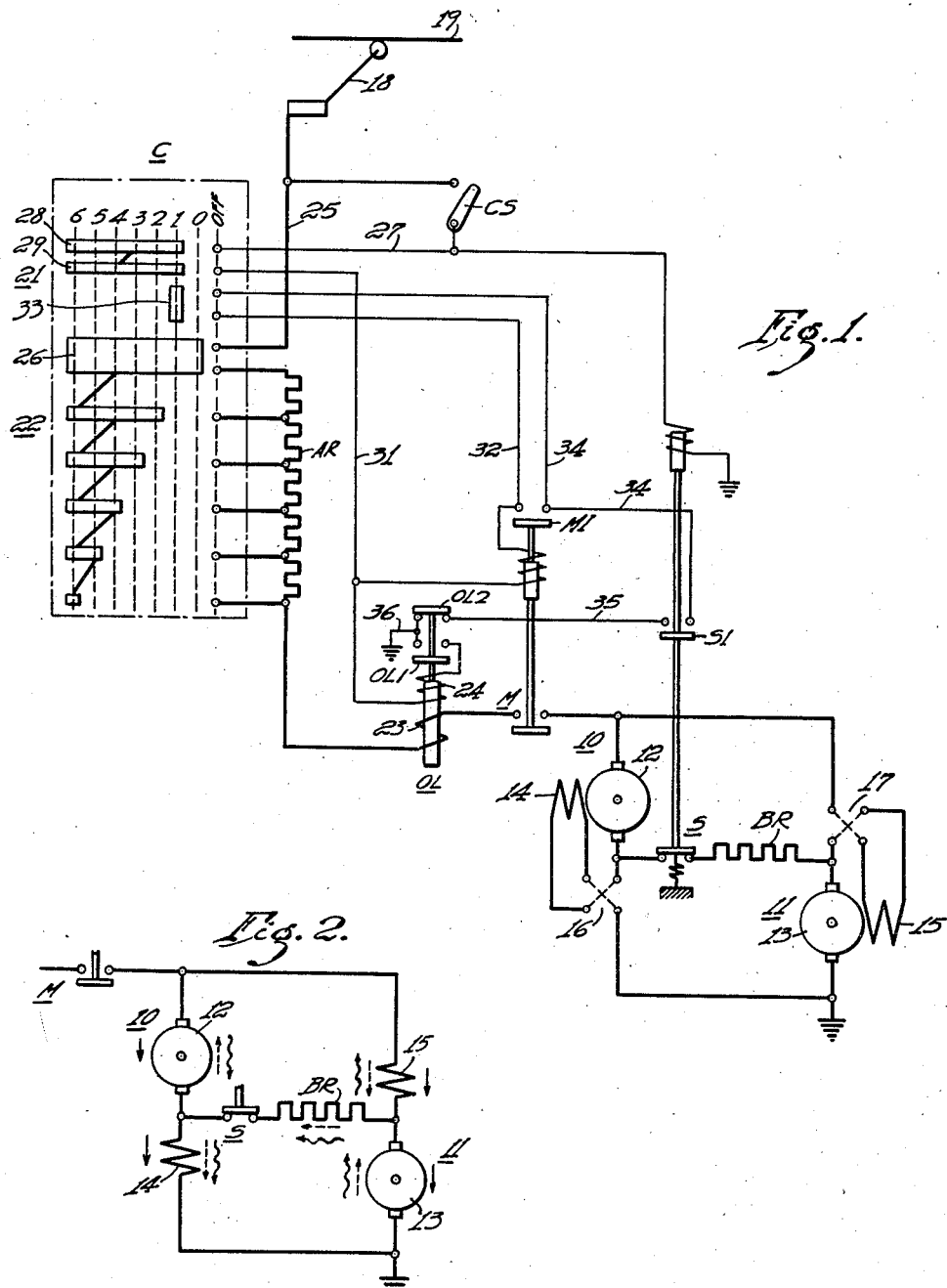

May 28, 1946.  H. C. KRAPF  2,400,998
CONTROL SYSTEM
Filed Sept. 19, 1944

WITNESSES:

INVENTOR
Herman C. Krapf
BY
ATTORNEY

Patented May 28, 1946

2,400,998

UNITED STATES PATENT OFFICE 2,400,998

CONTROL SYSTEM

Herman C. Krapf, Wilkinsburg, Pa., assignor to Westinghouse Electric Corporation, East Pittsburgh, Pa., a corporation of Pennsylvania Application September 19, 1944, Serial No. 554,841

8 Claims. (Cl. 172—179)

My invention relates, generally, to control systems and, more particularly, to systems for controlling the operation of electrically propelled vehicles, such as electric locomotives.

Locomotive operators often become excited when there is an interruption in the power supply and, as a result of the operator failing to take proper action, locomotives get out of control, especially in underground mines where grade conditions are severe.

An object of my invention, generally stated, is to provide an emergency braking system for electrically propelled vehicles which shall be simple and efficient in operation and which may be economically manufactured and installed.

A more specific object of my invention is to provide for automatically applying dynamic braking to an electrically propelled vehicle in the event of an interruption in the power supply.

Another object of my invention is to provide an emergency dynamic braking system which can be readily applied either to new locomotives or to existing locomotives.

A further object of my invention is to provide an emergency dynamic braking system which will produce a braking effect during motion of a vehicle in either direction.

Other objects of my invention will be explained fully hereinafter or will be apparent to those skilled in the art.

In accordance with one embodiment of my invention, emergency dynamic braking of an electric locomotive propelled by a pair of electric motors is produced by apparatus which functions to establish the braking circuit in case of failure of the power supply but not in case of an overload which operates the usual overload protective apparatus.

For a fuller understanding of my invention, reference may be had to the following detailed description, taken in conjunction with the accompanying drawing, in which:

Figure 1 is a diagrammatic view of a locomotive control system embodying my invention; and Fig. 2 is a schematic diagram of the main circuit connections.

Referring to the drawing, the system shown in Fig. 1 comprises a pair of motors 10 and 11, which may be of a type suitable for propelling an electric locomotive (not shown) and having armature windings 12 and 13 and series field windings 14 and 15, respectively; a magnetically closed, spring or gravity opened switch M; a spring closed, magnetically opened switch S; an overload protective relay OL; a control switch CS; a controller C which may be of the drum type; an accelerating resistor AR, and a braking resistor BR.

Reversing switches 16 and 17 may be provided for reversing the field windings of the motors 10 and 11, respectively, in the usual manner. The power for operating the motors 10 and 11 may be supplied through a current collector 18 which engages a trolley conductor 19. The trolley conductor 19 may be energized from any suitable source of power, such as a power generating station (not shown).

As shown, the controller C is provided with a set of auxiliary control circuit contact members 21 which are mounted inside the controller. However, if desired, these auxiliary contact members can be incorporated in a handle switch which may be of any one of several well known types. The main contact members 22 of the controller C are utilized to shunt the accelerating resistor AR from the motor circuit during acceleration of the locomotive in the usual manner.

The main contact members of the switch M are utilized to interrupt the main motor circuit, thereby relieving the controller C of main circuit interrupting duty, which reduces the maintenance expense on the controller. The switch M is provided with auxiliary contact members M1, the function of which will be more fully explained hereinafter. The auxiliary contact members M1 are closed when the main contact members of the switch are closed. The switch S is also provided with auxiliary contact members S1. The auxiliary contact members are closed when the main contact members of this switch are opened.

The overload relay OL is provided with an actuating coil 23, which is connected in the main motor circuit, and a holding coil 24. This relay is provided with two sets of contact members OL1 and OL2. The contact members OL1 are closed and the contact members OL2 opened when the series coil 23 is energized. The holding coil 24 functions in the usual manner to hold the relay closed after it has once been energized.

In order that the functioning of the foregoing apparatus may be more clearly understood, the operation of the system will now be described in more detail. When it is desired to operate the locomotive, control switch CS is closed, thereby energizing the actuating coil of the switch S which opens the main contact members and closes the auxiliary contact members S1 of this switch.

After the reversing switches 16 and 17 are actuated to the position corresponding to the desired direction of operation, the controller C is actuated from the "off" position to position "one". As the controller drum moves through the zero position, a circuit is established from a power conductor 25 through a controller segment 26 to the accelerating resistor AR.

When the controller is in position "one", the actuating coil of the switch M is energized through a circuit which extends from the power conductor 25 through the control switch CS, a conductor 27, controller segments 28 and 29, conductor 31, the actuating coil of the switch M, conductor 32, controller segment 33, conductor 34, the auxiliary contact members S1 of the switch S, conductor 35, the contact members OL2 of the overload relay OL, and conductor 36 to the ground. The closing of the main contacts of the switch M completes the main circuit connections to the motors 10 and 11, thereby applying power to the motors. The controller C may then be advanced to shunt the resistor AR from the motor circuit step-by-step, thereby accelerating the locomotive in the usual manner.

Power may be removed from the motors to stop the locomotive by actuating the controller C to the "off" position in the usual manner. It will be noted that the control circuit to the actuating coil of the switch M is through the auxiliary contact members S1 of the switch S. Therefore, the switch M cannot be closed unless the main contact members of the switch S are open, thereby eliminating the possibility of a short circuit across the power line.

Also the interval between the position at which the motor circuit connections are established through the segment 26 of the controller C and the closing of the control circuit to the magnetically operated switch M is such that when the controller is moved to the "off" position, the contact members of the switch M open before the connection at the controller drum is broken. When handle switches are utilized in place of the auxiliary contact members 21 on the controller, this time interval may be obtained by a lost motion device in the handle switch.

It will also be seen that the circuit through the segment 33 of the controller C is closed only when the controller is in position "one." These contact members are paralleled by the auxiliary contact members M1 when the switch M is closed. Therefore, on all positions of the controller C after position "one," the energizing circuit for the actuating coil of the switch M is maintained through the auxiliary contact members M1.

If for any reason there is an interruption of power to the vehicle and the switch M opens, the main motor circuit cannot be re-established until the controller C is returned to position "one" to reclose the switch M. In this manner, the resistor AR is reconnected in the motor circuit to protect the motors against flashing upon return of power.

When for any reason there is an interruption of power to the locomotive, the magnetically closed switch M opens and the spring closed switch S closes. The closing of the main contact members of the switch S establishes the dynamic braking circuit which is shown more clearly in Fig. 2. The degree of braking is determined by the resistor BR which is connected in the braking circuit.

As illustrated in Fig. 2, the motors 10 and 11 both function as generators during dynamic braking to retard the motion of the locomotive in a forward direction. The direction of current flow during dynamic braking for motion of the vehicle in a forward direction is indicated by the dotted arrows. The direction of current flow during normal operation of the locomotive is indicated by the solid arrows. Thus, it will be seen that during dynamic braking, the current through the armature windings of both machines is reversed, while the current through the field windings is in the same direction as when power is applied to the locomotive.

If the locomotive should stop upon the interruption of the power supply and then start to run backwards, thereby causing the machines to rotate in the opposite direction, the direction of current flow through the machines is indicated by the wavy arrows. Thus, assuming that the characteristics of the machine 10 are such that it has a higher residual voltage than the machine 11, the machine 10 functions as a generator, and the machine 11 functions as a motor.

Since the direction of rotation of the machine 10 has been changed, but the excitation of the field remains in the same direction, the armature current flows in the same direction as when the machine was operating as a motor. The machine 11 operates as a motor with reversed field and reversed armature current. Therefore, it tends to run in the same direction as when power was applied to the locomotive and opposes the backward rotation. Thus, an emergency braking effect is produced regardless of whether the locomotive continues to run in the same direction as when power was applied or whether it stops and drifts backwardly.

When power is restored to the locomotive, the dynamic brake is released, but power cannot again be applied to the motors until the controller C is returned to position "one" and the actuating coil of the magnetically closed switch M is energized to close this switch. This protects the motors against flashing, as hereinbefore explained.

It will be seen that the emergency dynamic brake is not applied in case the overload relay OL operates to open the switch M in case of an overload on the motors. Since the energizing circuit for the actuating coil of the switch M is maintained through the contact members OL2 of the relay OL, the coil is de-energized and the switch M opened to interrupt the motor circuit upon the occurrence of an overload.

However, the actuating coil of the switch S is not de-energized under overload conditions. Therefore, the main contact members of the switch S are not permitted to close to establish the emergency dynamic braking circuit.

It will be noted that power cannot be re-applied to the motors after the operation of the relay OL until the controller C is returned to the "off" position. The holding coil 24 of the relay OL is energized through the contact members OL1 of the relay when these contact members are closed by the operation of the relay. Once the holding coil is energized, it can be de-energized to release the relay only by returning the controller C to the "off" position.

From the foregoing description it is apparent that the control system herein described provides automatic emergency dynamic braking in case of loss of power to the locomotive because of failure of the power supply or when the trolley or current collector leaves the wire. The emergency braking will also function in case of failure or opening of the control switch CS, but, as explained hereinbefore, does not function in case of an overload on the motors. The emergency braking functions independently of the position of the reversing switches, that is, whether the switches are set for forward or reverse operation and independently of the position of the controller C. Furthermore, the emergency braking is applied without requiring any action upon the part of the operator.

The power cannot again be applied to the motors after the establishment of emergency braking until the controller is returned to the first position, thereby connecting the entire accelerating resistor in the motor circuit to prevent motor flashing. Maintenance expense on the controller is reduced since the motor circuit is always interrupted by the magnetic contactor. The system can be readily and economically applied either when a locomotive is being built or to existing locomotives since a relatively small amount of additional control apparatus is required.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. A control system for a plurality of electric motors disposed to be energized from a power conductor comprising, normally open switching means for connecting the motors to the power conductor, and normally closed switching means for establishing an emergency dynamic braking circuit for the motors, the closing of said normally open switching means being controlled by the position of said normally closed switching means, the opening of said normally closed switching means being responsive to the energization of said power conductor.

2. In a control system, in combination, a plurality of motors, a power conductor, normally open switching means for connecting the motors to the power conductor, normally closed switching means for establishing an emergency dynamic braking circuit for the motors, and auxiliary switching means actuated by said normally closed switching means for controlling the closing of said normally open switching means, the opening of said normally closed switching means being responsive to the energization of said power conductor.

3. A control system for a plurality of electric motors disposed to be energized from a power conductor comprising, power-closed switching means for connecting the motors to the power conductor, power-opened switching means for establishing an emergency dynamic braking circuit for the motors, and interlocking means actuated by said power-opened switching means for controlling the closing of the power-closed switching means.

4. In a control system, in combination, a plurality of electric motors disposed to be energized from a power conductor, power-closed switching means for connecting the motors to the power conductor, power-opened switching means for establishing an emergency dynamic braking circuit for the motors, and interlocking means actuated by said power-opened switching means for controlling the closing of the power-closed switching means, the opening of said power-opened switching means being responsive to the energization of said power conductor.

5. In a control system, in combination, a plurality of motors, a power conductor, self-opened power-closed switching means for connecting the motors to the power conductor, self-closed power-opened switching means for establishing an emergency dynamic braking circuit for the motors, and interlocking means actuated by said self-closed power-opened switching means for controlling the closing of the self-opened power-closed switching means.

6. In a control system, in combination, a plurality of motors, a power conductor, self-opened power-closed switching means for connecting the motors to the power conductor, self-closed power-opened switching means for establishing an emergency dynamic braking circuit for the motors, and interlocking means actuated by said self-closed power-opened switching means for controlling the closing of the self-opened power-closed switching means, the closing of said self-closed power-opened switching means being responsive to the deenergization of the power conductor.

7. In a control system, in combination, a plurality of motors, a power conductor, power-closed switching means for connecting the motors to the power conductor, a relay responsive to the motor current for controlling the operation of said switching means, power-opened switching means for establishing an emergency dynamic braking circuit for the motors, and interlocking means actuated by the power-opened switching means and co-operating with said relay in controlling the closing of the power-closed switching means.

8. In a control system, in combination, a plurality of motors, a power conductor, power-closed switching means for connecting the motors to the power conductor, a relay responsive to the motor current for controlling the operation of said switching means, power-opened switching means for establishing an emergency dynamic braking circuit for the motors, and interlocking means actuated by the power-opened switching means and co-operating with said relay in controlling the closing of the power-closed switching means, the opening of the power-opened switching means being controlled by the energization of the power conductor but not by the operation of said relay.

HERMAN C. KRAPF.